Sept. 20, 1927.  W. J. FENNELL  1,642,672
WATER SUPPLY CONNECTION
Filed Dec. 30, 1926
FIG. 1.
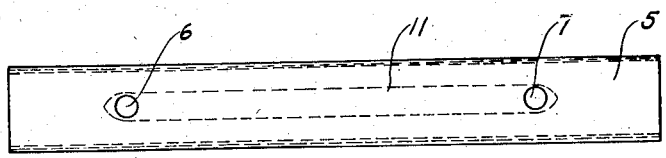
FIG. 3.   FIG. 2.
 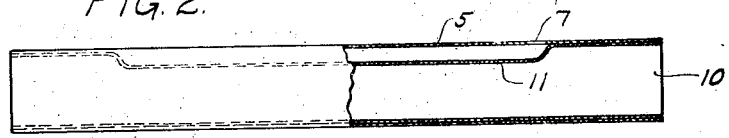
INVENTOR.
William J. Fennell
BY
Erwin, Wheeler & Woolard
ATTORNEY.

Patented Sept. 20, 1927.

1,642,672

UNITED STATES PATENT OFFICE.

WILLIAM J. FENNELL, OF MILWAUKEE, WISCONSIN, ASSIGNOR TO EVINRUDE MOTOR COMPANY, OF MILWAUKEE, WISCONSIN, A CORPORATION OF WISCONSIN.

WATER-SUPPLY CONNECTION.

Application filed December 30, 1926. Serial No. 158,024.

This invention relates to improvements in water supply connections of the general type shown in the patent to Mould, No. 1,502,479, patented July 22, 1924.

It is the object of this invention to utilize the principle therein disclosed while greatly reducing the cost of manufacture and simplifying the construction.

In the drawings:

Figure 1 is a plan view of a drive shaft housing for use in an outboard motor.

Figure 2 is a side elevation of a drive shaft housing partially cut away to a vertical axial section.

Figure 3 is an end elevation of the drive shaft housing.

Like parts are identified by the same reference characters throughout the several views.

In the device shown in the patent above referred to, a drive shaft housing was longitudinally grooved and a water supply pipe was fitted bodily into the groove to lie wholly within the radius of the housing wall. By the present invention the necessity of fitting such a pipe is obviated.

Instead of using a single tube of the requisite thickness of wall in the manufacture of the drive shaft housing, the present invention contemplates the use of two tubes having relatively thinner walls and together adapted to have the requisite strength. The outer tube 5 presents a uniformly cylindrical outer surface of neat and attractive appearance. This outer surface need not be broken except for the apertures 6 and 7 which afford communication through the wall of the outer tube to the water passage.

The inner tube 10 slides telescopically within the outer tube and is longitudinally grooved at 11 as if to receive a pipe in accordance with the invention disclosed in the above mentioned patent. Due, however, to the provision of two telescopically related tubes 5 and 10, no pipe is necessary in the practice of the present invention, and the water is confined within the channel 11 by the wall of the outer tube 5 which crosses such channel unbroken except for the apertures 6 and 7. The channel is of such a length as to terminate immediately adjacent said apertures. The close fit of tube 10 within tube 5 beyond the ends of channel 11 makes it unnecessary to fasten the tubes together in any way, since in practice no water will escape from the channel.

The water is delivered to the channel through any suitable fitting applied to tube 5 in registry with aperture 7 and leaves the channel through aperture 6 and a suitable distributing fitting whereby the water may be supplied to the cooling system of the engine regardless of the rotative position of the shaft housing and related parts.

My discovery that no means of sealing channel 11 is necessary obviously contributes greatly to the practical advantages of the present invention.

It might reasonably be anticipated that soldering or brazing or cementing tubes 5 and 10 would be necessary to make a tight joint around channel 11. It is found, however, that two tubes which may readily be telescoped together manually will withstand even a considerable degree of air pressure without leakage, and such water pressure as exists in channel 11 cannot possibly cause any water to leak out. It is probable that the capillary attraction of the two brass surfaces of the concentric tubes contributes to this unexpected result. In any event, the manufacturing advantage is great.

Attention is called to the fact that the circumferential extent of the channel is immaterial to the success of this invention so long as the ends of the two tubes are in closely nested position. The illustrated form of the invention, however, in which the channel comprises a narrow groove extending longitudinally of the tubes is preferred to an alternative construction in which the inner tube might be drawn intermediate its ends to reduce its diameter for a portion of its length while leaving it symmetrically circular in cross section. The reasons for preferring the illustrated construction are practical and are based upon the fact that the device disclosed is made with a minimum of labor from standard parts, two standard commercial sizes of tubing being fitted telescopically together after grooving the innermost tube by well known and commercially available machines.

I claim:

1. A shaft housing for the purposes described comprising inner and outer tubes concentrically nested together and closely fitted in water tight relation throughout their entire peripheries at their ends, one of said tubes being channeled intermediate its ends to provide a water passage between said tubes for a portion of their length.

2. A shaft housing for the purpose described, said shaft housing comprising a pair of telescopically related tubes closely nested at their ends in concentric relation, one of said tubes being channeled intermediate its ends to provide a water passage between said tubes, and said passage being sealed solely by the juxtaposition of the walls of said tubes at the ends thereof.

3. A shaft housing comprising a pair of telescopically related tubes having their ends closely nested in concentric relation, the wall of the inner tube being pressed inwardly for a portion of the length of said tube to provide a water channel between said tubes, and the wall of the outer tube being apertured to afford communication with said channel.

4. A shaft housing comprising a pair of telescopically related tubes having their ends closely nested in concentric relation, the wall of the inner tube being pressed inwardly for a portion of the length of said tube to provide a water channel between said tubes, and the wall of the outer tube being apertured to afford communication with said channel, there being nothing other than the close juxta-position of said tubes at their ends to make said channel water-tight.

5. A shaft housing comprising inner and outer tubes concentrically nested together at remote points and provided intermediate said points with radially spaced portions comprising the walls of a water passage, one of said tubes being provided with a port affording communication with said passage.

6. A device of the character described comprising an outer tube provided with spaced ports and an inner tube secured in concentric relation within said outer tube and closely fitted thereto beyond said ports, said inner tube having its intermediate portion formed inwardly from one port to the other whereby to afford a passage therebetween of which said tubes are the walls.

WILLIAM J. FENNELL.